J. W. BYTHER.
STAVE-JOINTING MACHINE.
No. 172,086. Patented Jan. 11, 1876.
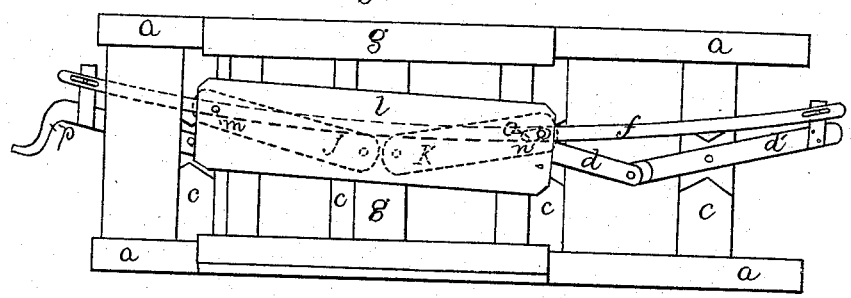
Fig. 1.
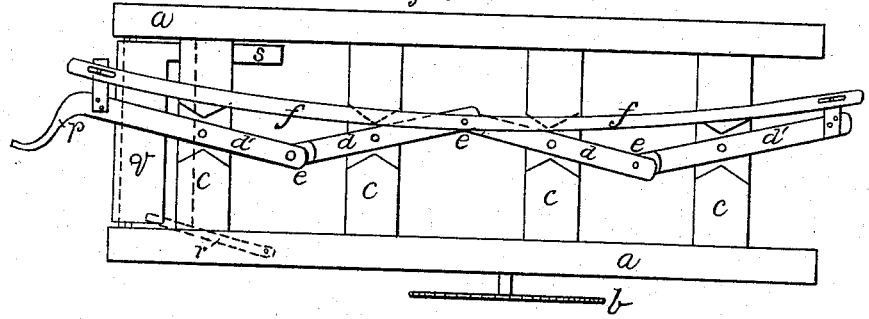 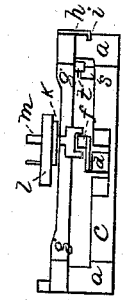
Fig. 2. Fig. 3.
Witness
John R. Mason
H. N. Fairbanks
Inventor
Joseph W. Byther
Per Atty Franklin Seavey

UNITED STATES PATENT OFFICE.

JOSEPH W. BYTHER, OF OLAMON, MAINE.

IMPROVEMENT IN STAVE-JOINTING MACHINES.

Specification forming part of Letters Patent No. 172,086, dated January 11, 1876; application filed September 17, 1875.

*To all whom it may concern:*

Be it known that I, JOSEPH W. BYTHER, of Olamon, in the county of Penobscot and State of Maine, have invented certain new and useful Improvements in Stave-Jointing Machines; and I do hereby declare that the following is a full, clear, and exact description thereof, that will enable others skilled in the art to which it appertains to make and use the same, reference being had to the accompanying drawings forming a part of this specification, in which—

Figure 1 shows a plan of my invention; Fig. 2, same with stave-table removed; Fig. 3, an end elevation.

Same letters show like parts.

The object of my invention is to produce a graduating edger for edging staves, by which the proper bulge may be given to either wide or narrow staves, automatically, in the operation of sawing.

My invention will be more readily understood by reference to the accompanying drawings, in which $a$ shows a frame, upon which the edger-table runs; and $b$, the saw. This frame $a$ is provided with cross-bars $c\ c\ c\ c$, at the centers of which are pivoted short rods $d'\ d'\ d\ d$, jointed to each other at their ends $e\ e\ e$, so as to be capable of swinging upon the pivots which attach them to the cross-bars. Upon these short rods is placed a long flexible rod, $f$, secured to the outer extremities of the rods $d'\ d'$, or to an offset on said rods, by a pin passing through a longitudinal slot at each end of the rod $f$, and also secured to the central joint $e'$ of the series of short rods, the arrangement being such that the rod $f$ is thrown from side to side of the frame $a$ by swinging the rods $d$ upon their central pivots, and as said rod $f$ is thrown toward the side upon which the saw is placed it is straightened, and vice versa. Upon the frame $a$ runs the edger-table $g$, held in place by a hook, $h$, running in a groove, $i$, in the frame $a$, or similar device. Pivoted to this table, at or near its center, are two arms, $j\ k$, upon which are placed a supplemental table, $l$, secured to said arm $j$ by a pin, $m$, passing through an opening in said arm $j$, and to the arm $k$ by a pin, $n$, passing through a longitudinal slot, $o$, in said arm $k$. This is done in order to enable the table $l$ to swing unequally at the ends. Both pins $m\ n$ are forked at their lower ends, and fit over the rod $f$. Upon this supplemental table is placed the stave to be edged, held in place at the end farthest from the operator by a knife-edge or similar device, to prevent its slipping, and at its near end by hand, or in any ordinary manner.

The operation of the machine is as follows: The distance of the rod $f$ from the saw is regulated by means of the short rods $d'\ d'\ d\ d$, which, at the same time, regulate the curvature of said rod, increasing it as its distance from the saw increases, and vice versa. The table $g$ runs upon the frame $a$ in a straight line; but the supplemental table $l$, by means of its pivoted arms and forked pins, is guided in a curved line by the rod $f$. The stave upon this supplemental table partakes of its motions, and as the stave is narrow, the flexible rod $f$, which forms the track for said table $l$, is moved toward the saw, decreasing its curvature. The table $l$, and consequently the stave, will move more nearly in a straight line, and the bulge given to the stave by the operation of sawing will be less. The curvature of the rod and of the line of motion of the table $l$ increasing as its distance from the saw increases, a wider stave will receive more curvature upon its edge, and this curvature will be in exact proportion to its width, so that any stave so placed as to be acted upon by the saw will be certain to receive the proper curve.

In order to prevent any change in position of the rod $f$ during the operation of sawing, I provide a friction-check, acting upon a lever, $p$, by which the series of rods $d\ d\ d\ d$ are actuated. This device consists of a broad-faced lever, $q$, pivoted under the lever $p$, and pressed upward against it by means of a spring, $r$, so as to hold it. This lever is provided with an arm, $s$, by which it may be depressed and the lever $p$ released. When the stave-table $g$ is drawn back preparatory to placing a stave in position, a projection, $t$, on its under side engages this arm $s$, forcing it down, and releasing the lever $p$, so as to allow the rods and arm $f$ to be adjusted as desired. When the table $g$ is pushed forward the arm $s$ is released, clamping the lever $p$ in the position in which it is placed.

I do not claim the machines nor the devices shown in the patents of L. R. Fulda, April 30, 1872, and L. R. Palmer, August 13, 1872, neither in their organization nor in the mechanism employed.

What I claim as my invention, and desire to secure by Letters Patent, is—

1. In a stave-sawing machine, the combination of a series of pivoted and jointed rods, $d'$ $d'$ $d$ $d$, rod $f$, and tables $g$ and $l$, arranged upon a frame, $a$, and operating substantially as set forth.

2. The combination of the series of jointed rods $d$ $d$ $d$ $d$, pivoted to a frame, $a$, as described, and rod $f$, jointed to said rods $d'$ $d'$ $d$ $d$ at the ends and center of the series, and serving as a track for the stave-table $l$, substantially as set forth.

3. In combination with the rod $f$, the table $l$, forked pins $m$ $n$, and arms $j$ $k$, pivoted to both tables $l$, and substantially as and for the purposes set forth.

4. In combination with the rods $d'$ $d'$ $d$ $d$ and lever $p$, operating said rods, the lever $q$, spring $r$, and table $g$, arranged and operating substantially as and for the purposes specified.

In testimony that I claim the foregoing I have hereunto set my hand this 14th day of September, 1875.

JOSEPH W. BYTHER.

Witnesses:
JOHN R. MASON,
WM. FRANKLIN SEAVEY.